(12) United States Patent
Caulfield

(10) Patent No.: US 8,929,601 B2
(45) Date of Patent: Jan. 6, 2015

(54) IMAGING DETECTING WITH AUTOMATED SENSING OF AN OBJECT OR CHARACTERISTIC OF THAT OBJECT

(71) Applicant: John Caulfield, Santa Barbara, CA (US)

(72) Inventor: John Caulfield, Santa Barbara, CA (US)

(*) Notice: Subject to any disclaimer, the term of this patent is extended or adjusted under 35 U.S.C. 154(b) by 174 days.

(21) Appl. No.: 13/740,227

(22) Filed: Jan. 13, 2013

(65) Prior Publication Data

US 2013/0126703 A1 May 23, 2013

Related U.S. Application Data

(63) Continuation of application No. 12/101,139, filed on Apr. 10, 2008, now abandoned.

(60) Provisional application No. 60/922,587, filed on Apr. 10, 2007.

(51) Int. Cl.
| | |
|---|---|
| *G06K 9/00* | (2006.01) |
| *H04N 5/30* | (2006.01) |
| *H04N 5/232* | (2006.01) |
| *H04N 5/378* | (2011.01) |
| *H04N 5/217* | (2011.01) |
| *H04N 5/335* | (2011.01) |

(52) U.S. Cl.
CPC .............. *H04N 5/30* (2013.01); *H04N 5/23245* (2013.01); *H04N 5/378* (2013.01); *H04N 5/217* (2013.01); *H04N 5/335* (2013.01)
USPC ..................... 382/103; 348/207.99

(58) Field of Classification Search
USPC ............................ 348/207.99; 382/103, 192
See application file for complete search history.

(56) References Cited

U.S. PATENT DOCUMENTS

| | | | | | |
|---|---|---|---|---|---|
| 4,197,584 | A | * | 4/1980 | Blazek ........................... | 356/394 |
| 4,651,211 | A | * | 3/1987 | Weckenbrock et al. ...... | 348/702 |
| 6,330,371 | B1 | * | 12/2001 | Chen et al. .................... | 382/260 |
| 6,980,692 | B2 | * | 12/2005 | Chamberlain ................ | 382/170 |
| 2006/0257004 | A1 | * | 11/2006 | Chen ............................. | 382/103 |

* cited by examiner

*Primary Examiner* — John Strege
(74) *Attorney, Agent, or Firm* — Mark Rodgers

(57) ABSTRACT

Detection of a target object or a characteristic of that object, e.g. temperature or movement in an image of a scene at a focal plane of the image and with processing of signals representative of the image occurring at that focal plane with a sensor and an integrated circuit processor on an imaging circuit chip used to record the scene. Moreover, processing of the signals representative of the image and the object or characteristic of the object can all be processed in parallel. This arrangement allows for filtering of objects with the ability to distinguish the object generating signals from background clutter. The incorporation of the entire circuit in this integrated circuit chip increases the compactness and efficiency. Moreover, all signal processing will occur at the focal plane eliminates the need for external processing electronics thereby increasing compactness and efficiency while reducing spatial noise.

16 Claims, 11 Drawing Sheets

000
IMAGING DETECTING WITH AUTOMATED SENSING OF AN OBJECT OR CHARACTERISTIC OF THAT OBJECT

RELATED APPLICATIONS

This application is based on and claims the benefit of and priority from my U.S. utility application Ser. No. 12/101,139, filed Apr. 10, 2008 which in turn claims the benefit and priority of provisional patent application Ser. No. 60/922,587 filed Apr. 10, 2007, for Automated Cuing Circuit for Image Sensors, the full contents of which are hereby incorporated herein by reference.

GOVERNMENT RIGHTS

The U.S. Government has a paid-up license in this invention and the right in limited circumstances to require the patent owner to license others on reasonable terms as provided for by the terms of Contract No. NAS1-20841 awarded by the USAF FA 8651-08-C-0 146.

BACKGROUND OF THE INVENTION

1. Field of the Invention

This invention relates in general to automated sensing of an object or a characteristic of that object in or derived from an image of a scene and more particularly, to both a method and apparatus for sensing of target data associated with an object in a scene generated on an image by an integrated circuit at a focal plane of an imager and which allows rapid processing in parallel and with substantially improved ability to filter objects of interest or characteristics of that object of interest.

2. Brief Description of Related Art

Compact systems which employ image sensors for generating and recording images in an electronic device have proliferated rapidly in past several years. Personal data devices and even miniature computers are frequently carried by individuals and which devices have the capability of generating images along with generation of data, or perform other activities for which they are designed to accomplish. Cell phones, digital cameras and camcorders are some examples of these commercially available consumer and/or military products which have image sensing capabilities.

The small size and the requirement for portability allow products of this type to benefit from the existence of the recent improvements in miniature electronics. Moreover, these improvements allow for size reduction and weight reduction, as well as a reduction in power consumption of the image sensing apparatus. However, image sensing is almost necessarily performed with a circuit different from that circuitry used for processing the image. Image sensing in the same integrated circuit chip would allow for the benefit of imagers with increased performance and dim object sensitivity, as well as in an increase in detection range, and user convenience and utility.

In the past decade, image sensing using digitally controlled image sensors has improved substantially with improvements in integrated circuits and various processing techniques. Accurate detection of an activity which may take place at a remote site is highly desirable when the detection generates an accurate image of a scene and an object in that scene with good visibility and accuracy and would effectively find use in numerous military applications and in crime solving and the like. As a simple example, by quickly analyzing an image it is possible to detect a source of an object or a characteristic of that object and where the source of that object or characteristic may be, for example, a launcher of a projectile. By knowing the location of the source at that remote site, it is possible to take offensive action against such activities, such as destroying the source of that projectile.

One of the primary problems in detection of target data within an image and generated by an integrated circuit is that background clutter and images of other objects or characteristics of these other objects appear in a scene. Again, as a simple example, if one was trying to determine the source of a projectile, and an automobile was moving in proximity to the site of the projectile source, a processing apparatus and method would generate images from those automobile signals, thereby interfering with the detection of the projectile or a characteristic, such as a trajectory, and hence location of a source of the projectile.

In recent years, there have been a number of visible and infrared based sensors that create images from semi-conductor materials rather than from a film. These sensors typically operate at the focal plane with analog, or otherwise, digital electronics and in all cases are external to and may be quite remote to a detector and a read-out integrated circuit. At present, the read-out integrated circuit is used to sense the photo-current which is generated from a silicon or other semiconductor material while transforming the signals, such as the photo-currents into images.

There have been attempts to add more functionality to the read-out integrated circuit including for example, arbitrary window addressing and high speed multiplexing. The present invention, in contrast, provides a much greater improvement in the development of read-out integrated circuit processing by the use of fully parallel analog processing techniques. These analog processing techniques make the use of the high density circuitry now available. Some of these circuits allow for detecting over one hundred objects of interest in the pixel regions of the image read-out integrated circuit.

In the past, only a limited amount of image processing could have been performed at the focal plane array of sensors. However, processing was limited and the problem of excess noise was typically quite large in the prior art devices. The downstream noise in a signal path oftentimes materially interfered in the attempts to determine an activity at an image scene. Moreover, digital signal processing designers avoided focal plan array processing because of the significantly high cost involved.

In addition to the foregoing, in the prior art image sensors, battery life was relatively short due to the amount power required for any efficient operation of the image sensor and processor. Moreover, weight was also another factor, particularly where the image sensor and support electronics had to be transported manually. Often times, the size of the image sensor equipment substantially reduced its functionality. In fact, because of stringent weight and size and cost limitations and the fact that practically all imaging systems required external processing, image sensor technology is still avoided in many areas where it could be used. Furthermore, these systems were not sufficiently light in weight and small and compact so that they could be transported in a field environment.

It would be desirable to provide a device capable of sensing an image and reproducing that image on a display while using a single chip containing both sensor and a processing algorithm for data on the same circuit chip and without reliance upon an external processor, such as a desk-top digital computer for digital signal processing into an image. In the preferred embodiment of the invention it is even preferable that the sensor and the associated electronic processor has the capability of sensing and reading out multiple high resolution fovea and to start and stop fovea based on the existence of a signal of an object in an image without an external processor. A device of this type must necessarily be user friendly and provide a variety of working modes simultaneously.

OBJECTS OF THE INVENTION

Some of the objects and advantages achieved by the present invention allow for a fully integrated imaging system which is small and compact, light in weight and designed to be transportable in a field environment. The integrated circuitry of the present invention allows for the sensor or sensors to be part of the integrated circuitry and both near or adjacent to the focal plane of an image to be generated. This allows for performance of parallel processing of a large number of simultaneously generated signals in a manner which permits the extraction of intensity variations in both and time and in space.

Signal conversion to an image is performed with analog processing, charge sharing and summing, differencing and thresholding and which are used to achieve target or target characteristic detection. The object or characteristic of the object can be detected and generated in a scene or apart from the scene. Control over speed and amplitude variation allows discrimination in a narrow or wide target dynamic characteristic space.

This new technique offers compactness and efficiency, and with a multitude of scientific and practical improvements of the current state of the art using serial off-image processing. In effect, the automated detecting used in the image circuitry of the invention allows a new and substantial improvement in size reduction, increase of power and reduction in weight, while performing on-site processing which in the past, had to be performed off of the image focal plane.

In one embodiment of the present invention, it is possible to provide an imaging system of the type stated which can be made in a form of a portable and compact unit capable of being easily carried by a single individual, or mounted on or in an unmanned platform, without the need for a separate external digital computer. An imaging system of the type described herein is capable of reliably processing data from a sensor chip without added excess noise and without reliance upon an external processor. Moreover, the system of the invention does not require a large external processor for making decisions on the basis of the location of high resolution images. In one aspect of the invention, it is desirable to detect, rank, and read out multiple high resolution fovea and the system of the invention is capable of easily handling that requirement without any external processor.

Additional objects and advantages are also described in more detail in connection with the brief summary of the invention and in the detailed description of the invention. Other advantages or objects will become apparent and more fully appreciated after considering the details of this invention.

BRIEF SUMMARY OF THE INVENTION

The present invention provides an automated detecting and locating circuit for image sensors capable of sensing a scene and object of interest in that scene or one or more characteristics of the object. Even moreso, the automated detecting and locating circuit of the invention is capable of generating an image of the object itself, apart from the scene.

The invention, in one important embodiment primarily deals with the detection of a brightness change in a moving object of interest, such as a fast moving object and has the capability of segregating that fast moving object from other objects and even slower moving objects. In like manner, the imaging system of the present invention can detect and locate other characteristics of an object of interest. Some of these characteristics, for example, may provide the speed of an object, color of an object, the temperature of an object and even the pixel size of an object, and even more basic features, e.g. orientation of an object. Moreover, it is capable of generating an image, based on only a portion of the size of an image, such as, for example, the height of the image or the like.

In one of the principal aspects of the present invention the circuit detects a physical characteristic of a moving object of interest in a scene, such as a change in brightness, to enable determination of the location of that object source. The circuit would thereupon generate an image of that scene and also the object in that scene. However, more importantly, it is possible to generate a binary image of the object or a characteristic of that object. The image of the object may be within the scene or may be separated from the scene so that only the object or the image of the luminous movement of change of that object or other characteristic of that object scene is shown. There may be multiple objects and backgrounds in a scene and the invention will look for a characteristic, such as brightness change or motion.

One of the principal aspects of the invention is the fact that all of this is accomplished by using one or more pixels or detectors at a focal plane of the object. Moreover, it is preferable to have a signal processing chip which has both a sensor and processing capability on that signal chip. This chip would be located at the focal plane so that there is an array of detectors or detector elements at this focal plane. In addition, localized processing is performed directly on the chip, when compared to a prior art, system which typically uses an external computer to perform a type of target detection and targeting imaging. In other words, the sensor circuits are capable of detection of both motion, or even intensity variations, in a localized area of the image and the present invention takes advantage of that fact.

In accordance with the invention a signal circuit chip is provided in a plurality of sensor circuits or otherwise, it is incorporated in a single signal processing chip. Moreover, the detectors and the entire processing chip are located at the focal plane such that there is an array of detectors at the focal plane, as described above.

In a standard off-board processing technique the sensor output is necessarily introduced, through a number of high speed multiplexer outputs, into a large processor box having a real-time processing bandwidth of ten to one hundred giga-operations per second, which would allow for processing of about 30.0 mega-pixels per second. The mega-pixel rate may be different for different algorithms. In the present invention, each sensor generates an output, through amplifiers, at a focal plane array of similar sensors, and uses parallel analog processing with the on-board processor. This allows for reduced bandwidth output at a rate, typically, of 1-10 kilo pixels per second, compared to the significantly high rate of 30 mega-pixels per second with the presently available prior art imaging systems.

The circuit of the invention relies upon a photo-detector which generates electrical signals representative of a scene and is thereby capable of generation of an image of that scene. The photo-detector usually comprises a single integrated circuit chip with a plurality of photo-detectors mounted on that chip. The array of photo-detectors which senses light can be accomplished with the silicon bonded to the read-out integrator circuit chip and which chip would generate a detector signal. The output of each of these photo-detectors is then introduced into an integrator which integrates the detector signals and thereby generates a standard video output. The output of the integrator is also introduced into an automated activity detector. This activity detector operates in conjunction with previously described photo-detectors or so-called "auto-detectors", and all detectors operate at the focal plane.

The auto-detectors generate an auto detection activity output, using filtering and thresholding with an amplifier arrangement. The output of the auto-detect circuit is also introduced into a threshold comparator which compares a threshold of the signal generated from the image against a predetermined threshold level. There is then a one bit digital output exceedance which is introduced into a pooling circuit, and the output of which is used to reinforce a detection of a target object.

A used herein, the term "detector" will refer, generally, although not exclusively, to a specific semiconductor unit which is capable of sensing a photon of light. The term "sensor" will, generally although not exclusively refer to a group of detectors which sense the outputs of a group of detectors. The detector of the type used in the present invention will have an output for each signal sensed and which sensor is usually formed as an integral structure with a circuit chip in preparation thereof. The term "detector" will also include those detectors in which the detector is not necessarily a monolithic structure but one in which the detector element is bonded to the chip, but operates in the same manner as the monolitic and integrally formed detector chip.

The output of the multi-mode signal auto detecting circuit arrangement generates a normal fovea of an image and also a binary track output of some aspect of that image, such as an object or a characteristic of the object. This latter output enables one to determine the trajectory and even the source of a moving object which appears in the image. This gradient can be used to lower the egomotion which might generate a false object alert. In addition, an output of the integrator produces an image of the scene, and an output of a gradient for optical flow produces an image of the moving object or objects relative to the scene. The output of a threshold comparator generates binary signals representing change or movement of the object or other characteristic of the object.

The circuit of the invention actually filters and extracts the object from the image in a binary form to create an automatic detection of the object image. The detection is based on the fact that the object has some parameters such as structure, movement, or brightness change within an image field. The invention also relies upon filtering and thresholding to calculate the object and place the object in a desired image location and also with the desired intensity range without displaying other portions of the targets of interest.

The detection circuit of the present invention also is designed to scale back the high bandwidth data in a manner similar to biological vision principles and also provides levels of compression in the pixel regional count and in the dynamic range in the target object. In contrast, current state of the art imaging processing is typically performed using an algorithm in an external digital computer. It again bears emphasis that in most cases, this computer is a large, heavy and power consuming system which is separate from the image sensor. In no case is there any effective system in which the processor is integral with the sensor on a circuit chip.

The present invention also uses a fully parallel, analog processing arrangement on that chip for providing the on-chip processing. In this case, each charge is stored in a pixel proportional to the photo-signal impinging upon the pixel. With localized processing, and high density processing circuitry, an excess of one hundred objects in the pixel region of the image electronics can now be processed in parallel. Using local signal processing, the invention is also able to sample imaging activities directly at the focal plane and more importantly at the focal plane array of all of the sensors in a manner which is far more efficient than in external imaging processors.

The present invention uses circuitry within the integrated circuit which allows for extraction of intensity variations in time and in space. In effect, the circuit relies upon analog processing, charge sharing and summing, as well as differencing and thresholding to achieve a target detection. In addition, speed and amplitude and even amplitude variations are detected to allow discrimination in a narrow or wide dynamic characteristic space. As an example, if a target of high temperature is imaged on a lens with two pixels and moves over an image plane, a threshold and comparison can be performed directly in the imager circuitry and in a parallel fashion. This allows for compactness and efficiency and offers a multitude of scientific and practical improvements over the current state of the art of serial and off-image processing.

The present invention also provides a unique cell arrangement for each sensor cell. The on-chip control in the cell arrangement in combination with, at least the exceedance memory, is capable of generating a plurality of fovea representing signals at high resolution and moreover has decoders on a pair of margins thereof for decoding the address location of each of the fovea representing signals. This address location is introduced into an address memory directly on the chip. Moreover, there is an exceedance memory which stores exceedance data and enables detection of fovea to generate digital/analog output signals therefrom and disregard non-useful data. These output signals are introduced into a memory and compared against adjacent exceedances levels to determine whether or not there is a sufficient number of local exceedances to declare a target, such as a target object. The signals exceed a predetermined threshold level. Moreover, the signals from the comparator are introduced into a video output in order to provide a full video output display.

Each fovea-representing signal produces a plurality of pixels in a signal region of interest of the sensor. These local regions of the pixels are then introduced into a summing amplifier which operates as an exceedance summer. In other words, the signals are evaluated to determine if they exceed the digital and pooling level-threshold level. If they do, the signal is introduced into a pooling decision logic circuit and centering distance logic and then introduced into the exceedance memory.

The target of pooling signals operates in a manner analagous to a biological vision system. Each pixel is passed through a temporal filter and a spatial filter and as a result certain features are highlighted. Then pixel is measured against a threshold each pixel which exceeds a threshold is then pooled with other pixels exceeding that threshold to determine if the pixel achieving the threshold is not merely anomalous noise, as opposed to being declared as a target. In other words if all such signals in that group are positive the detected action will be deemed movement and not a false alarm.

Although the invention will be operable primarily with a sensor and a processing circuit for processing signals from that sensor on the same chip, with advances made in signal processing, it is possible to have e.g. the amplifier in a processing circuit of one chip perform the amplification for a signal from another closely spaced apart chip in electrical contact with the first chip. Nevertheless the other chip will also be in close proximity to the focal plane array so that processing of the signal form the first chip will still be processed at or in close proximity to the focal plane array of sensors. Thus, the term "at the focal plane array", as used herein, will also include processing by a processing circuit of another proximal sensor chip. In addition the term "on said circuit chip" or "at said circuit chip" with reference to signal processors, as used herein, will include signal processors on closely spaced apart circuit chips.

The present invention provides numerous advantages over the prior art systems. In one important aspect, the circuit of the invention allows for image processing to be performed directly at the focal plane. Some of the advantages which are achieved with the system of the present invention are hereinafter discussed in more detail. A non-limiting list includes processing at the focal plane, improving signal to noise ratio in the imaging processing, the extraction of hot and cold, small and large, fast and slow moving and stationary targets, and in addition, with significantly less power utilization.

This invention possesses other many other advantages and has other purposes which may be made clearly apparent from a consideration of the forms in which it may be embodied. These forms are shown in the drawings forming a part of this present specification. They will now be described in detail for purposes of illustrating the general principles of the invention. However, it is to be understood that the following detailed description is not to be taken in a limiting sense.

BRIEF DESCRIPTION OF THE DRAWINGS

Figure 1:
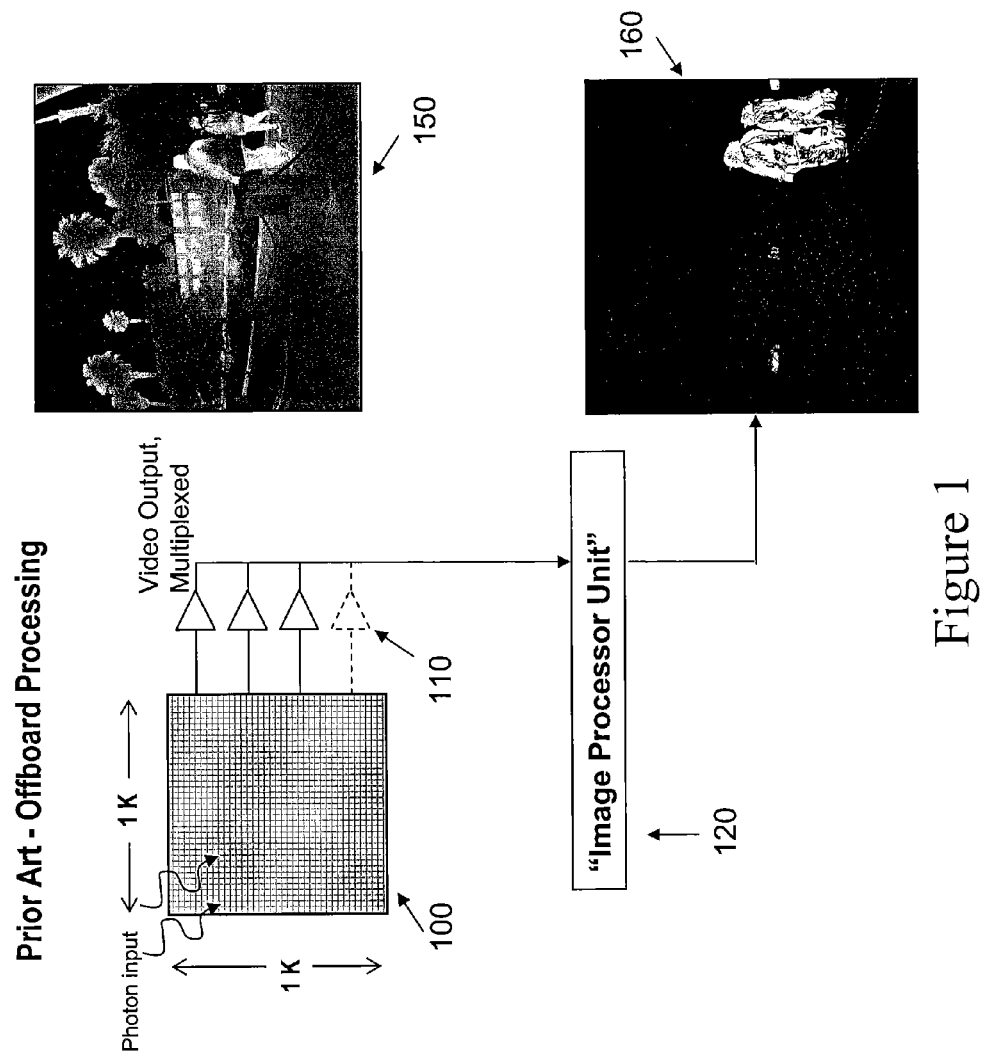
Figure 2:
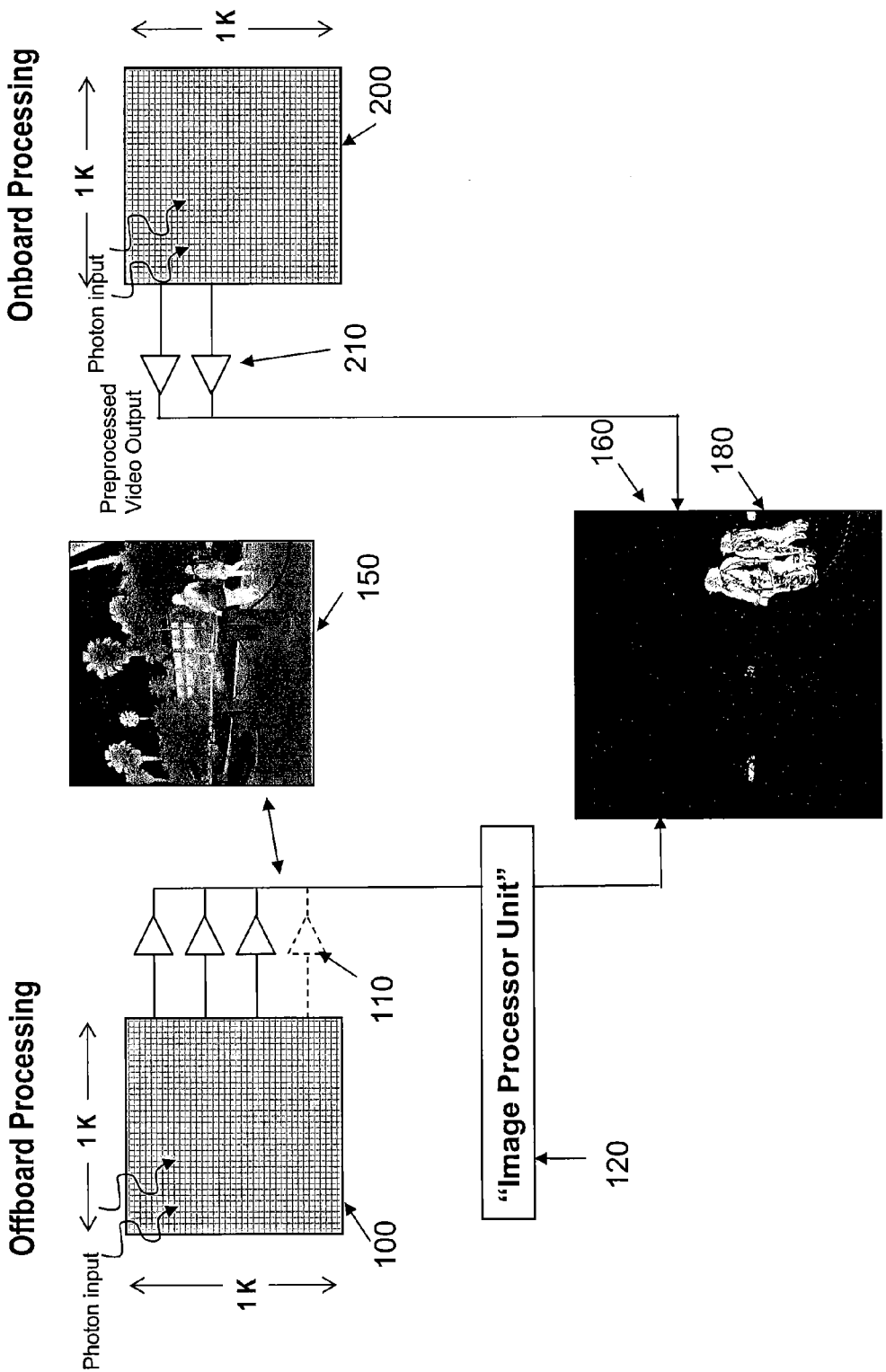
Figure 3:
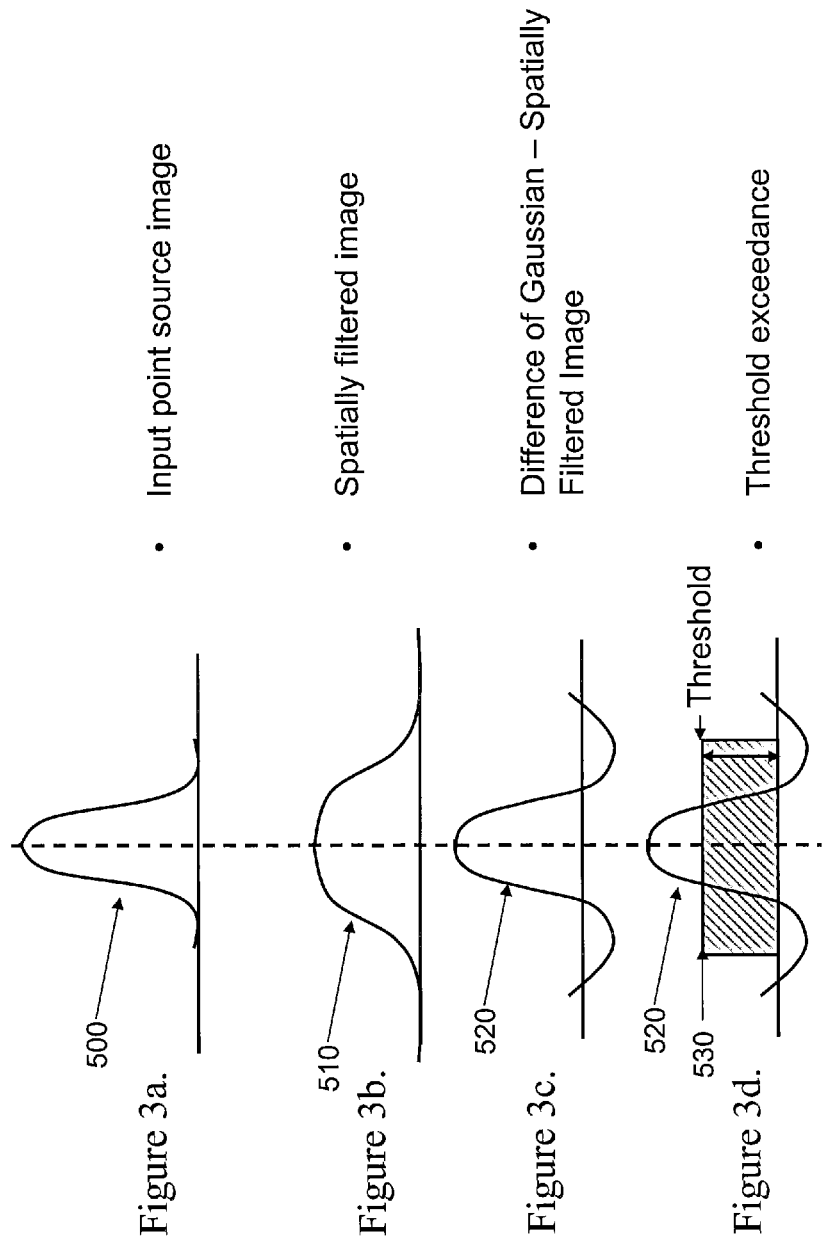
Figure 4:
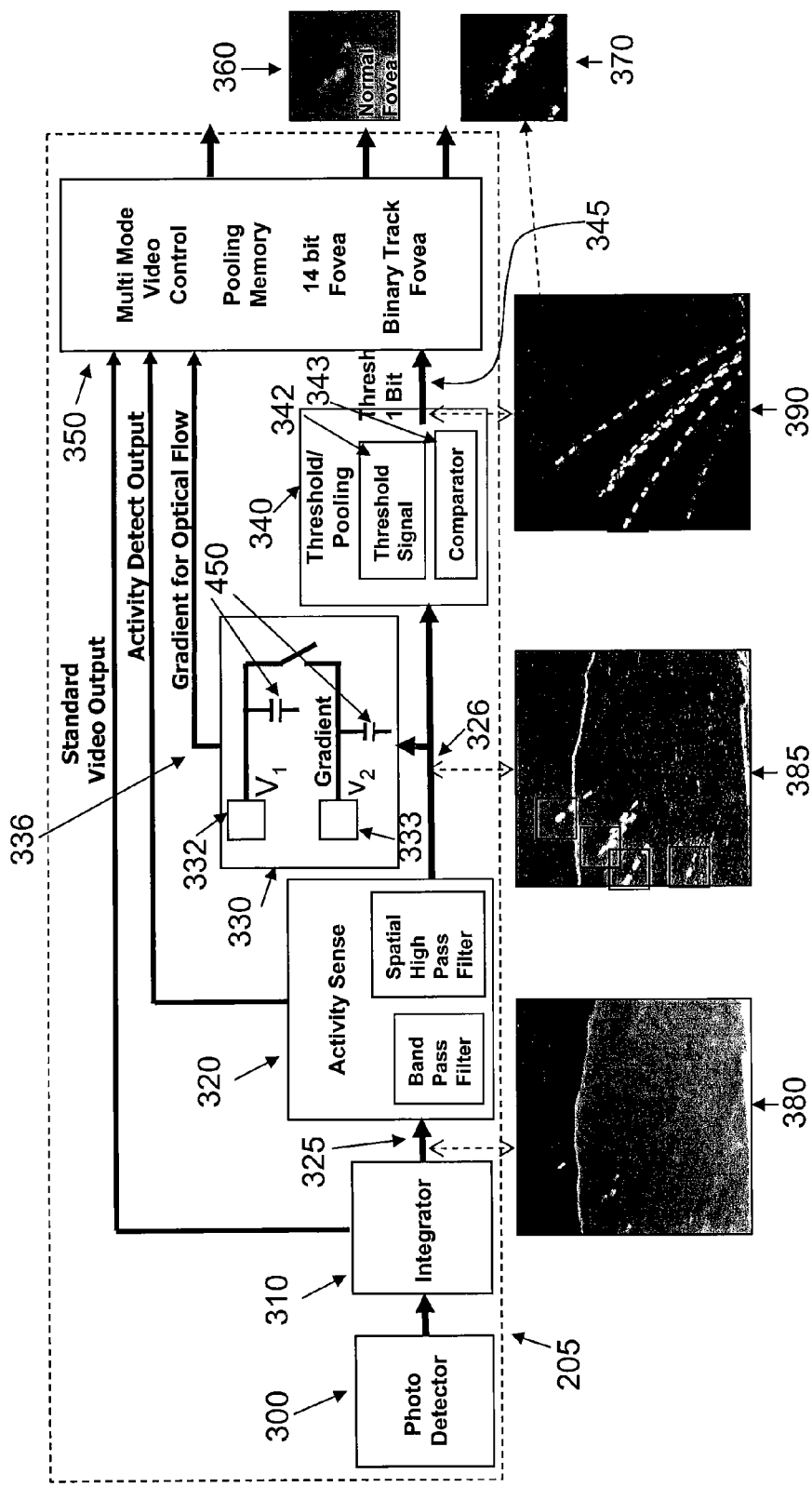
Figure 5:
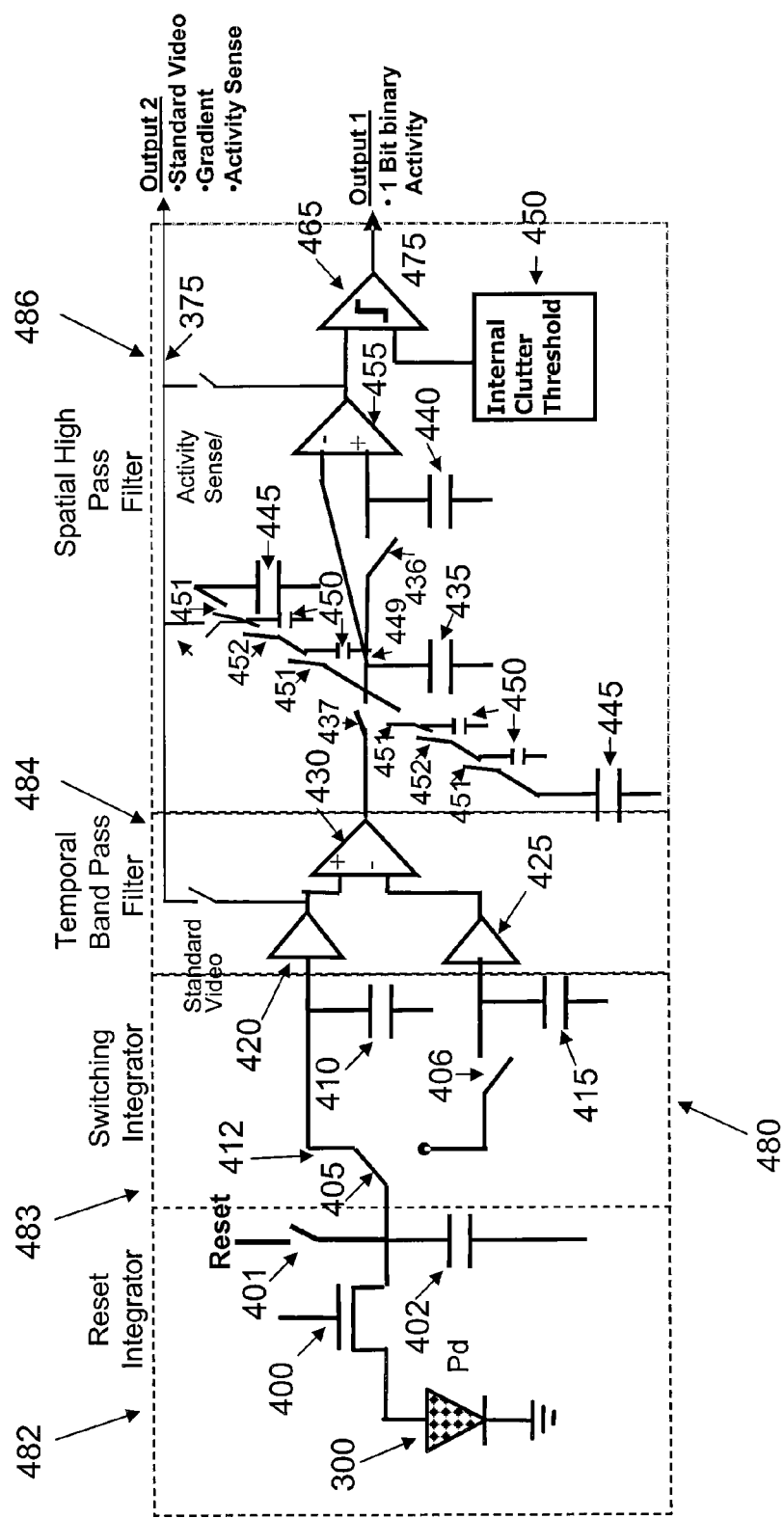
Figure 6:
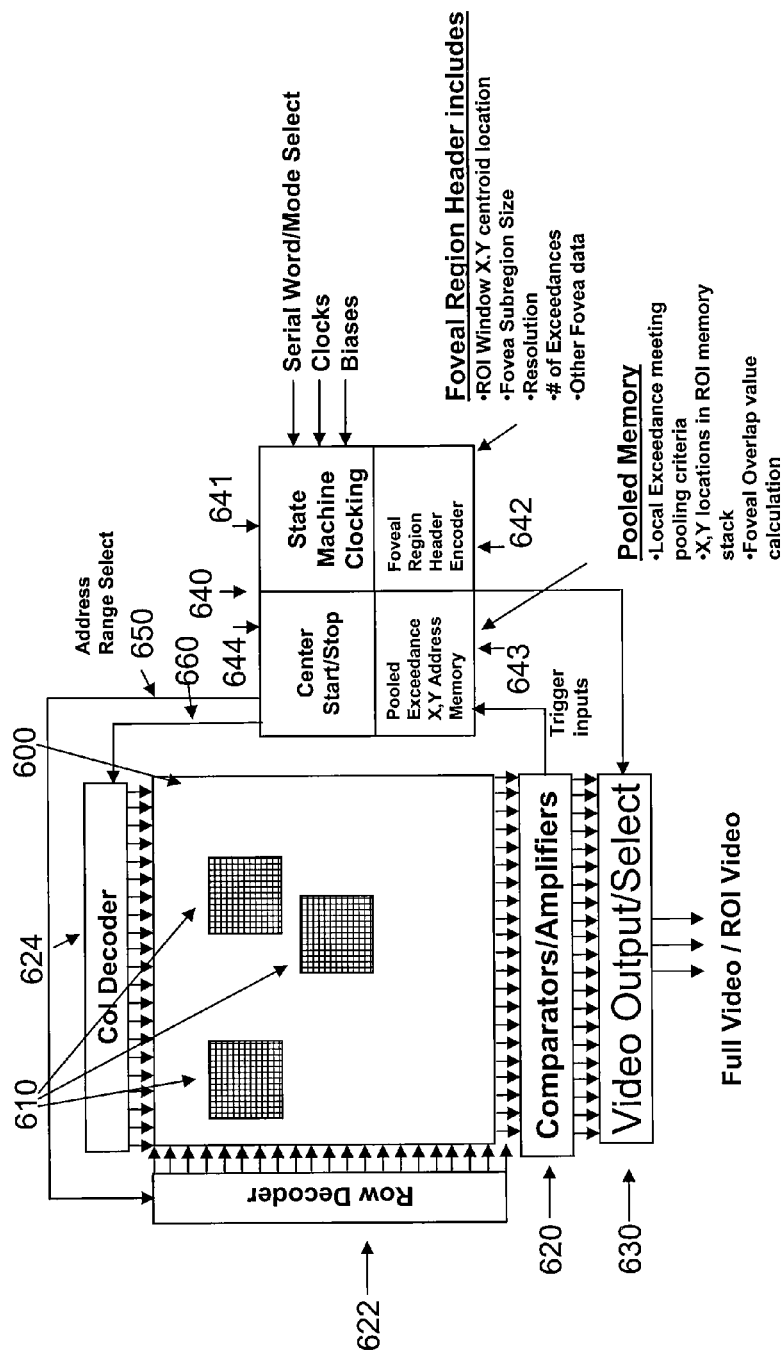
Figure 7:
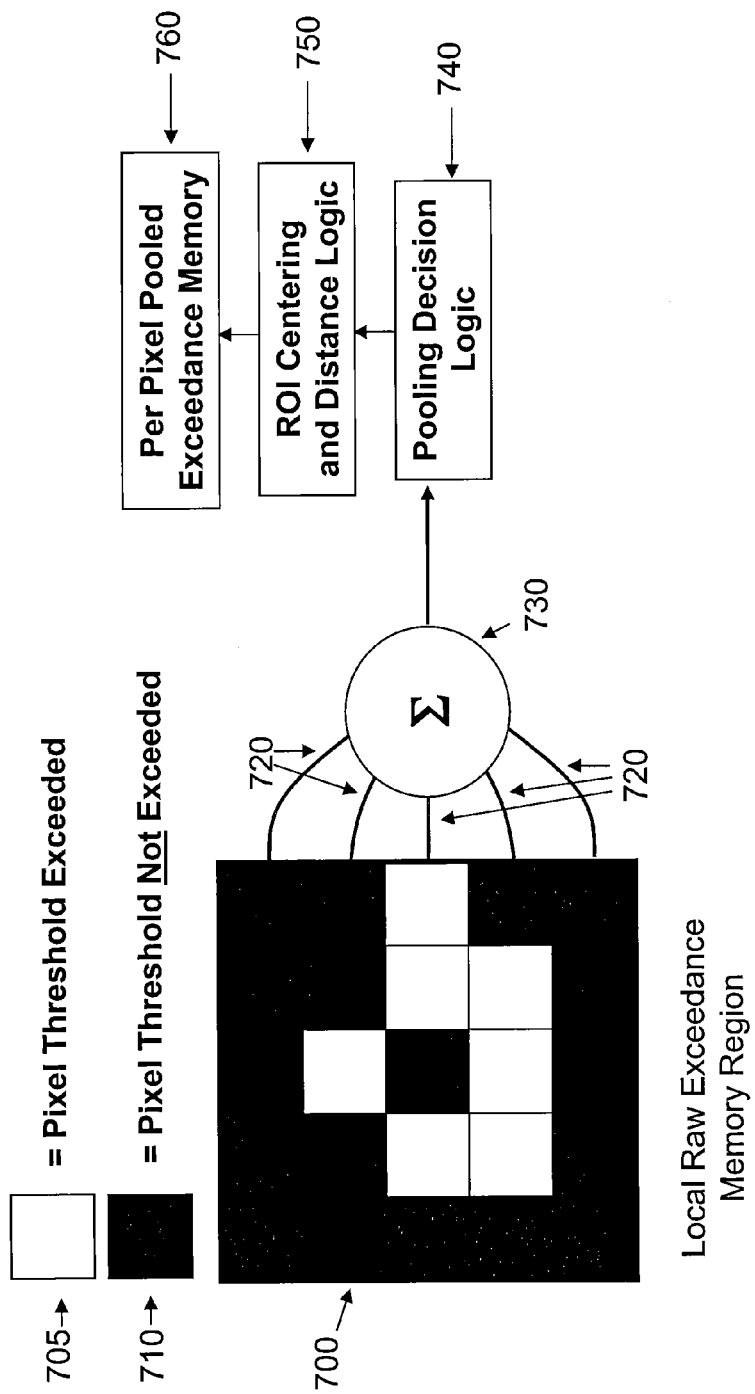
Figure 8:
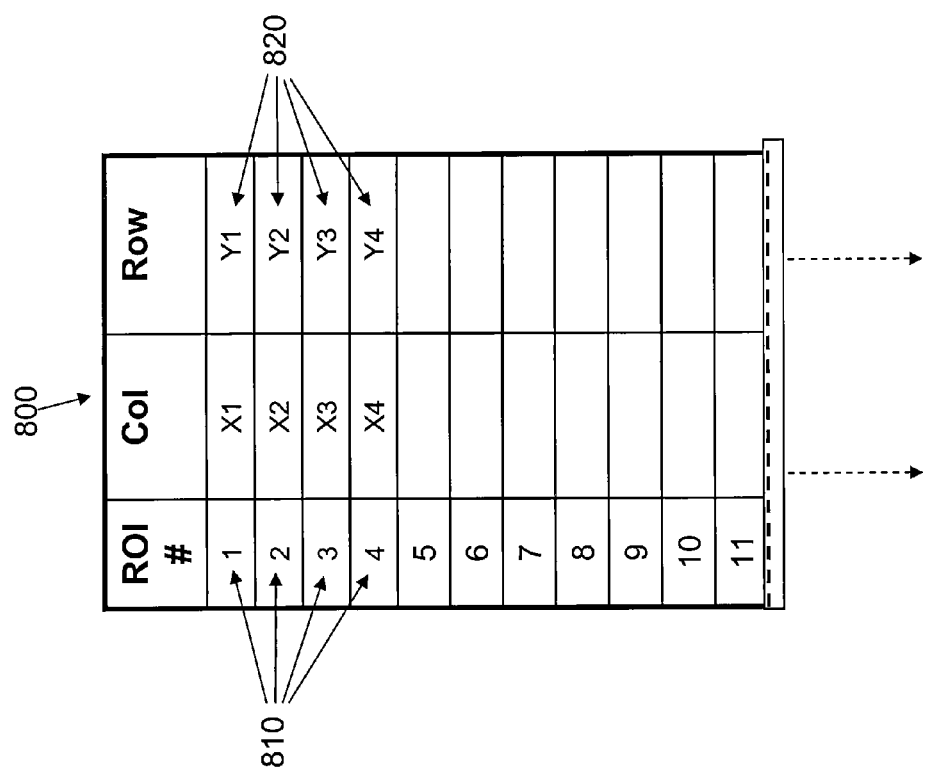
Figure 9:
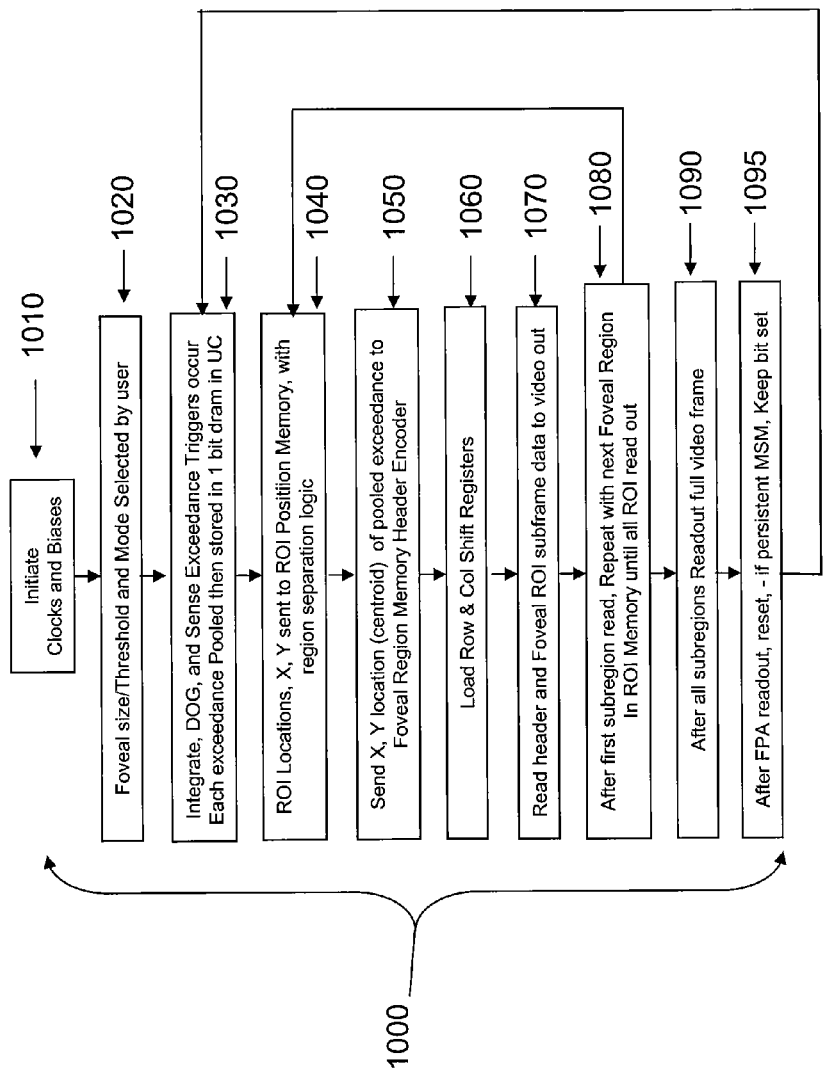
Figure 10:
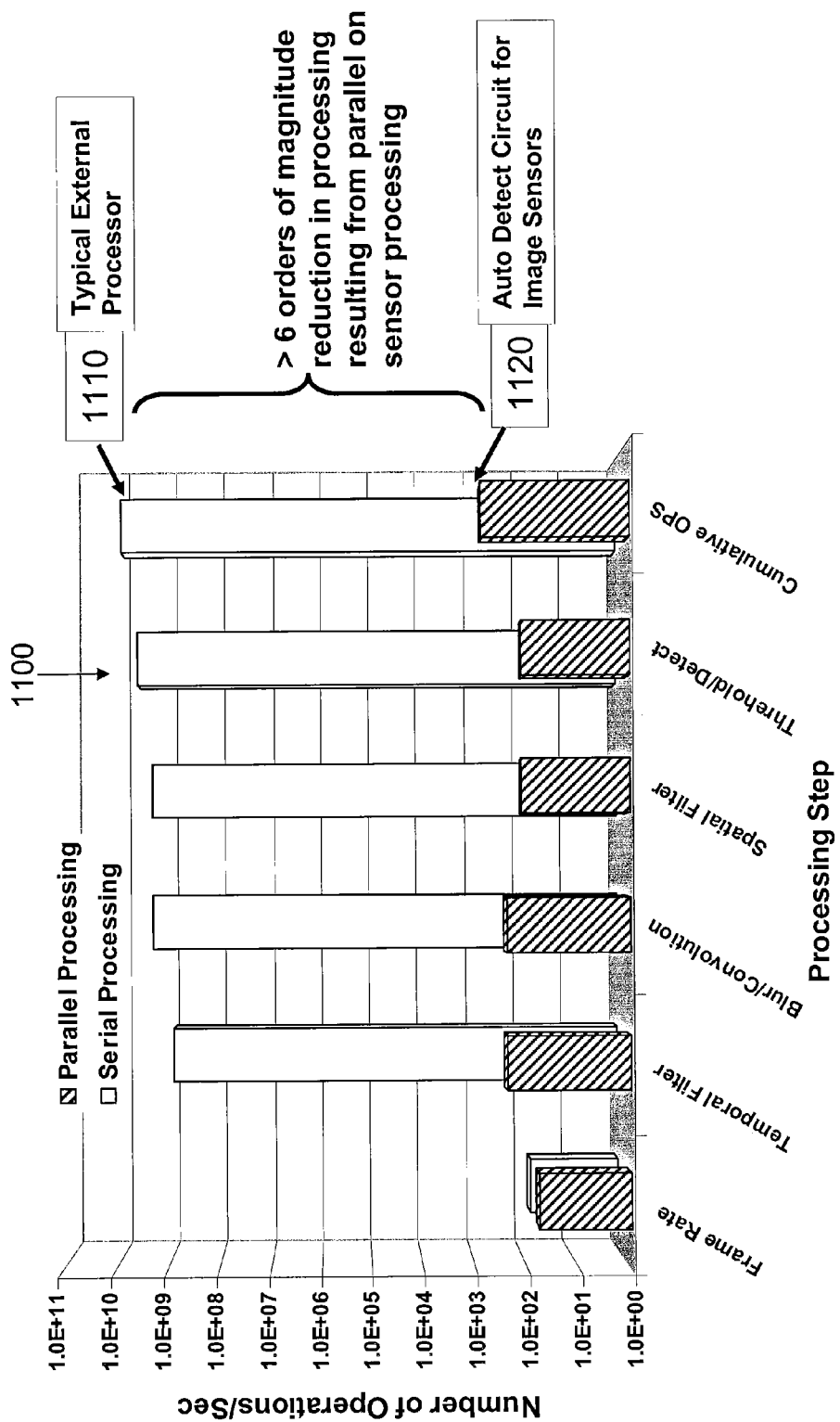
Figure 11:
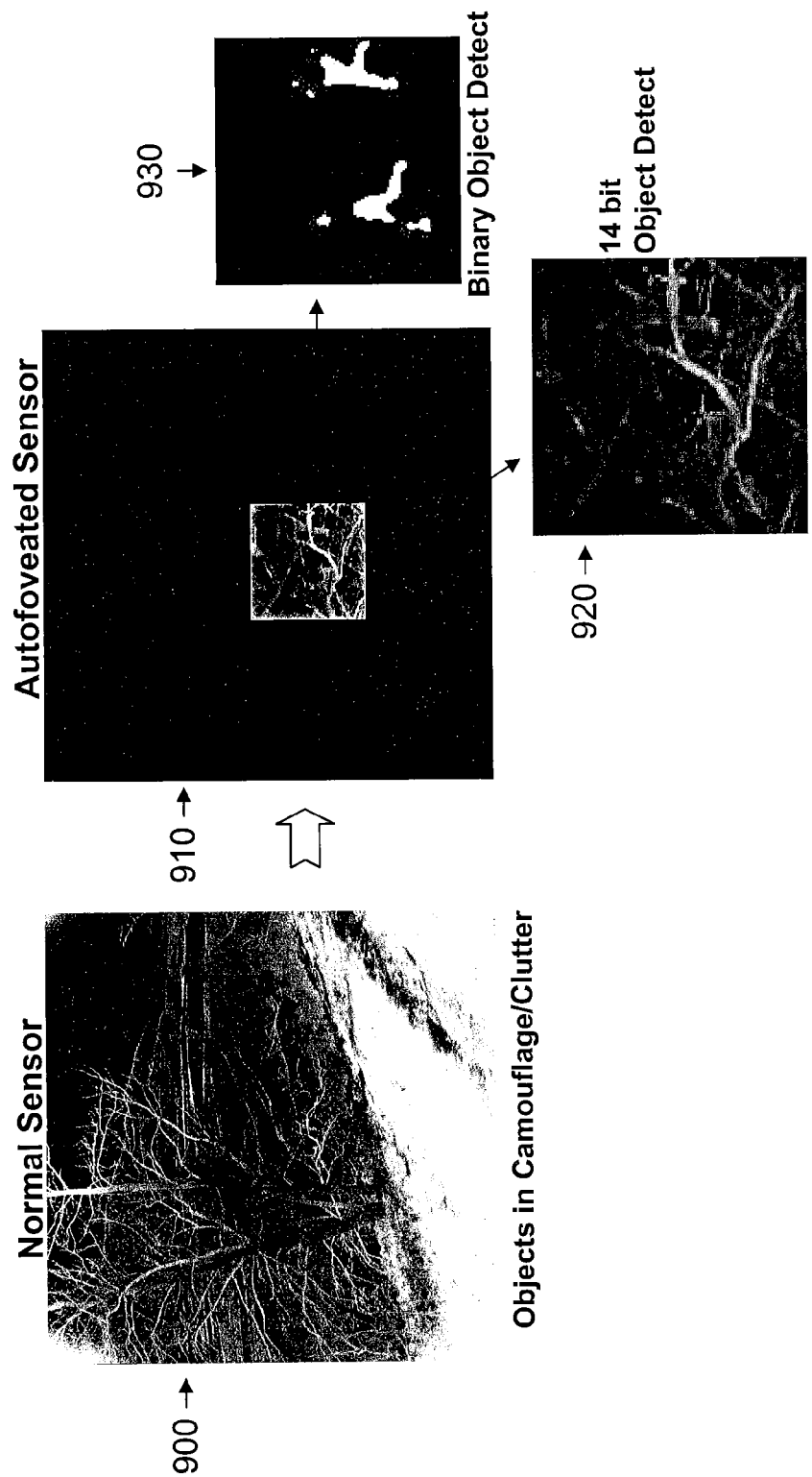

Having thus described the invention in general terms, reference will now be made to the accompanying drawings in which:

FIG. 1 is a schematic block diagram showing a prior art image generating system in combination with an image of a scene and a processed image of a moving object in that scene created by sensors not at a focal plane and using an off-board processor;

FIG. 2 is a schematic block diagram showing a prior art imaging system in FIG. 1 along with an imaging system based on the present invention, for purposes of comparison and images produced thereby to compare the similarities and the differences between the two systems and which also illustrates the reduced bandwidth using on-sensor processing in the system of the present invention, compared to the prior art system;

FIG. 3 is a composite of FIGS. 3a-3d showing wave-forms of signals which are obtained at various portions of the automated imaging system of the invention and in particular, showing a target object identification using a difference of Gaussian type high pass filtering to detect objects of interest with motion;

FIG. 4 is a signal flow diagram circuit view of an imaging system of the present invention using automated target detecting sensors and more specifically showing image data temporally and spatially processed, followed by a difference of Gaussian spatial high pass filtering, gradient calculating, thresholding and target localization;

FIG. 5 is a circuit with electronic components of the imaging circuit to achieve a focal plane image with parallel processing with the system of the present invention, and more specifically showing how the circuit filters and removes time-varying noise and clutter and the ability to key on objects of interest for extraction;

FIG. 6 is a schematic block diagram showing a flow plan of the signal processing and command of the state logic and timing and which calculates the signals exceeding a threshold level and local pooling binary measures;

FIG. 7 is a schematic diagram showing the region of pixels in a sub-region of a sensor and summing of threshold exceeding signals, centering and fovea overlap control as well as pooling decision logic;

FIG. 8 is a chart showing the object coordinates in an X and Y memory for the location of a pixel and whether or not the pixel was introduced into an exceedance memory and more specifically a method of assigning memory address with target pooling locations at threshold exceedance:

FIG. 9 is a logic flow diagram showing the various steps in generating one or more images with the imaging system of the present invention and more specifically showing the flow diagram for a state logic controller and the logic which is required to execute an automated sensor processing control and imaging;

FIG. 10 is an illustration of a chart showing the steps involved and the bandwidth of required operations in a comparison of the system of the present invention and a standard prior art system, and more specifically a comparison of an automated detection with a substantial magnitude of reduction in output bandwidth and which is accomplished with only a small number of on focal plane array data sensors; and FIG. 11 is series of photographic reproductions showing how the sensor circuit of the invention detects motion and amplitude variations with a suppression of local clutter and how an object of interest is imaged and generated.

DETAILED DESCRIPTION

Referring now in more detail and by reference characters to the drawings which illustrate practical embodiments of the present invention, FIG. 1 designates a conventional, commercially available, prior art image processing system. In this case the imaging system in part contains an integrated circuit chip, which is identified by reference numeral 100, and typically has a pixel density of one thousand pixel size or greater in the X-axis and in the Y-axis, with each frame, that is a group of pixels which make-up a full frame at any point in time. There is no target detection and there is no attempt to detect a target object, in the image or even apart from the image.

The circuit chip which contains the image sensors has outputs directed to an imaging processor 120, as hereinafter described in more detail. It can be observed that the outputs of the chip 100 are introduced through output amplifiers 110 and into the image processing unit 120. An output of the circuit chip itself at a full data rate, for example, of 30 mega-pixels per second would generate the image 150 at bit depth of resolution of 12-16 data bits. After the image is processed in the image processing unit 120, an image that may have target objects can be generated. The processed data is illustrated in the image 160 of FIG. 1.

It can be observed that the image processor operates 120 at a full bandwidth data input with high speed and real-time processing electronics. The processor will process the images and provide object discrimination. However, in order to process an image, of large image format, the process must possess the ability to process at a rate of giga operations per second. Moreover, several watts of power, typically well in excess of ten watts, would be required for operation of the processing unit. In other words, this is the expected number of operations per second required to provide real-time processing on 30-60 $H_2$ frame data rate.

FIG. 2 illustrates the prior art imaging system with the standard off-board processing, as well as the auto detecting on-board imaging system of the present invention, in the same figure to show comparison therebetween. In this case, in addition to the description of the processing unit of FIG. 2, there is also shown a schematic representation of imaging circuit chip 100, the same as the imaging circuit chip 100 of FIG. 1, and also having the same 1,000 by 1,000 pixel cell arrangement. In the embodiment as shown in FIG. 2, the circuit chip 100 has outputs introduced through amplifiers 110 and introduced into a display, but at a reduced data rate of, for example, one to ten kilo-pixels per second and a reduced pixel/bit depth of data, just as in FIG. 1.

The advantages and benefits of using on-board processing will be hereinafter described in more detail. The term "off-board" refers to an arrangement where the processing is performed separately by a separate processing unit, as for example, an external and possibly, a remotely located processing unit, such as a digital computer, typically a large and heavy computing unit. The term "on-board" processing, as used herein, will refer to the processor integrated directly into the circuitry of the chip and on the chip, typically at the focal plane of the sensor or read-out integrated circuit or so-called "ROIC".

The vast differences between the processing system of FIG. 1 and the new sensor-processor integrated processing system shown in the right-hand portion of FIG. 2 can best be illustrated by a comparison of the right-hand portion and the prior art left-hand portion of FIG. 2 of the drawings. In effect, FIG. 2 shows a comparison between the standard imaging processor with video outputs and a processor detecting circuit of the present invention using an on-board image processing unit. In this case the processing system of the present invention allows an object, such as a target object 180 in the image 160 to be extracted while removing the necessity of transmitting the inactive data. The resultant temporal spatial and thresholding level on the automated detecting circuit of the invention results in an output image. This output image may be essentially the same image in content as that from an output standard imager using an off-board central processing unit 120, but where the unit 120 lacks in quality and processing efficiency.

Referring now to FIG. 4, there is provided an automated detection circuit 205 which shows an image transformation at certain of the stages in a process sequence. One of the important aspects of the invention is the fact that light, of various wave lengths can be processed, including, for example, the visible light as well as ultra-violet light, and short-wave, mid-wave and long wave infrared, generally in a wave length range of about 0.2 to about 40 micro-meters.

In order to more fully appreciate the automated detection circuit of the invention, the process of light conversion to photo-charge is briefly described. Also the processing of the photo-charge and the separation of offset signals which include dark current variations in the sensor detectors is hereinafter briefly described. Noise which is associated with the original signal and the dark current (hereinafter described) and dark current variations, as well as shot noise from the current, including the drift and low frequency noise, are hard to separate from the real signal. The circuit of the present invention can suppress a large fraction of this noise while preserving and enhancing the objects of interest, namely those target objects of interest in the images.

Referring again to FIG. 4: it can be seen that the circuit 205 comprises a photo-detector 300 typically referred to as a "photo-detector" or "detector" 300 which converts the signal photons from the light into photo-electrons. The photo-sensors typically are not ideal and contribute dark current, apart from any current representing a signal of an image to be generated and which is typically referred to "dark current". The present invention therefore uses an integrator 310 as a capacitive storage, or otherwise, a one-dimensional to two-dimensional array of capacitors, which store both the photo-charge and a dark current charge for a charge integration frame.

The integrator 310 stores the detector charge and has an output to an activity sensor 320. However, the integrator 310 generates an output 315 which is capable of generating an image 380. This image 380 is a representation of the full bit range of the integrator signal.

The auto-detection activity sensor 320 provides for temporal and spatial processing to reduce most, if not all, of the noise sources which can arise form the detector and the electrical circuits. When the noise has characteristics similar to those of the target objects in the image, it is even more necessary to suppress that noise. The temporal and spatial filtering in the activity sensing unit 320 use over-sampling to suppress blinking pixels. These blinking pixels will appear typically for a few frames, but the over-sampling, along with the application of a decaying weighting function to the frames, attenuates the effects of blinking. The blinking signals typically originate in the photo-detectors 300 due to defects in the semi-conductor, but are effectively removed in the activity sensing unit 320. Most of the scene based clutter is suppressed by a spatial filter. However some of the sensor induced clutter is suppressed by a temporal band-pass filter.

The auto sensing unit 205, in effect, therefore provides data for a difference of Gaussians that operates as and is effectively a high pass filter. Preferably, it will be a spatial high-pass filter. This difference of Gaussians functioning unit accentuates high frequency features and reduces clutter from the image environment. In effect, the filters are used to subtract a blurred rendition of each pixel from the signal to thereby accentuate an object of interest. Blur is actually subtracted by the capacitors 450 from the unblurred signal forming a spatial filter, allowing high pass signals to be subtracted. In this way it is possible to see if a target object is present. The activity sensor actually senses a change in scene brightness and the image 385 in FIG. 4 shows the presence of an image which had been high-pass filtered.

An output 326 from the activity sensing unit 320 will produce an image 385 which is a representation of the image data after the activity sensing unit 320. The activity sensing unit 320 is a light sensor as aforesaid. If a signal passes through a band-pass filter, then that is recognized as an activity which may be taking place. The sensor therefore acts in conjunction with a high-pass filter to constitute the activity sensing unit. The activity sensing unit 320 in all pixels provides a parallel analog temporal spatial processor. When a signal passes through a band pass filter and spatial high-pass filter, then that is recognized as an activity of the image which may be taking place. The detector therefore acts in conjunction with a band-pass filter and a spatial high-pass filter to constitute the activity sensing unit.

The difference in Gaussian unit is essentially one or more filters. In effect, the filters are used to remove a blur from the signal to thereby accentuate an object interest. Blur is actually added and then removed by a spatial filter allowing high-pass signals to pass through. In this way it is possible to see if a target object is present. The activity sensor actually senses a change in scene brightness and FIG. 4 therefore shows the presence of high-pass filter 322.

It can be seen that the target object in the image 385 is now more fully apparent with respect to an outline of a background portion of the scene in that image. The activity sensing unit 320 also has an intermediate output directed to a gradient calculator 330, to operate essentially as an optical flow controller. This auto-detecting chip uses optical flow information to separate any self-generated motion, or so-called "egomotion", from the actual target object motion.

The gradient calculator is an electronic calculator which measures the effective average brightness level between two neighboring pixels, which is a key factor in a determination of optical flow. The gradient detector 330 of FIG. 4 schematically shows a pair of pixels 332 and 333 and each of which are introduced into neighboring capacitors 450 for measuring brightness. The output of the calculator is a measure of the differences of brightness. The voltage difference between the two light values V1 and V2 gives the mean brightness. When the mean brightness is divided by the interpixel distance X, the measure of brightness is given. The expression $$\frac{V1 - V2}{X}$$

is the gradient.

The activity sensor has an output to a threshold-pooling circuit 340. The threshold-pooling circuit 340 will generate a threshold signal 342 for purposes of comparison and which uses a local or global threshold signal level to apply to a comparator 343 in the threshold-pooling circuit 340. This comparator 343 will determine if the photo-signals exceed the reference threshold level, and if they exceed that level, it will thereby create a "high" or so-called "on" output from the comparator 343 in the threshold-pooling circuit 340. Preferably, the comparator 343 is a binary comparator and the signals which are below the threshold level are the so-called "Off" signals or "low" signals. The threshold-pooling circuit 340 also contains a pooling circuit, which constitutes a further detector to determine if more than one threshold exceedance exists. If those signals which exceed the threshold level are present they represent a real signal of interest. If the signals do not exceed the threshold level, they are considered a "false" signal and are disregarded.

The state of exceeding a threshold is typically referred to as an "exceedance" and is a determination of whether there is a real target object, or not. Further real target discrimination is accomplished by pooling the localized exceedance pixel values. If there are sufficient number of local pixels which exceed the threshold level, beyond those which do not exceed that level, or extend over several sequential frames in close proximity to one another, then the exceedance levels are considered to be "real" and stored in a state logic memory 350 within the state logic control circuit 350. This state control circuit 350 is, actually a selectable multi-mode full frame video multiplexer. It is capable of generating multiple output modes, including a normal 12-16 bit fovea and a binary track fovea. There can be provided an output 345 from the threshold-pooling circuit, which is a representation of the output from the full raw auto detected image 385, but transformed into a high confidence image by the pooling circuitry in the threshold-pooling circuit 340. This signal typically would be free of challenging artifacts, such as a warm hill boundary against a cold sky background.

It can be seen that the signals which are processed in the integrator 310, the activity sensing unit 320, the gradient control circuit 330 and the threshold-pooling circuit 340 are routed to the multiplexer 350. This multiplexer has logic which can select and route the video signals from any of these immediately described processing modes to the video outputs to generate these images 360 and 370. These video outputs are also capable of being "auto foveated" which is also controlled by the pooling-exceedance memory. There is also provided a timing control circuit 641, more fully hereinafter described in connection with FIG. 6 of the drawings, and which provides the basic capabilities of chip timing, clock and exceedance biasing, and control and exceedance data management, as well as video routing control. The logic in the circuit, which is effectively a peripheral control and sequencing logic, can automatically generate centered foveal regions of any of the signals derived from the photo-sensor 300, the integrator 310, the activity sensor 320, or the gradient control 330 and the threshold-pooling circuit 340 and pooled exceedance random access memory. As a result, it can be seen that signal control with the multi-mode control circuit 350 of FIG. 4 is a very versatile and multi-mode architecture, capable, not only of thresholding for detection, but pooling and reinforcing the existence of target objects. This auto-detection circuit, in the process, will also reduce the pixel noise, as well as electronic noise and other noise, and provide for thresholding and preferentially holding only the pooled target objects or targets of interest in the pooled exceedance memory for a user-determined amount of time.

The multiplexer in 350 provides the benefit of mode selection and foveation in the video stream in real time and this allows the auto detecting circuits to discard redundant data, thereby allowing a target object to be tracked and evaluated over time. This will allow a view to determine the location of the activity associated with the target, and the output bandwidth of the sensor will be reduced by four to six orders of magnitude. This type of target detection, therefore, allows for a much faster discrimination with a high confidence discrimination of whether or not the objects detected in the field need further surveillance or can be disregarded. The circuit also provides a signal path and mode selector which is internal to the chip using on-board processing and providing recognition capability.

FIG. 5 illustrates a preferred embodiment of the circuit which is used to perform the auto detecting with analog signal processing. This circuit, designated as 480 comprises four major circuit sections, which are a reset integrator 482, a switching ping-pong integrator 483, a temporal band-pass filter 484 and a spatial high pass target detecting filter 486. In this case, a photo-detector 300 (identified in connection with the description of FIG. 4), senses the incoming light simultaneously impinging on all of the sensor cells, due to the fact that the light is focused at the focal plane. The photo-current generated from the impinging light is also simultaneously integrated in a "snap-shot" mode.

Photo-generated carrier signals will flow through a transistorized input amplifier, with a bias applied thereto. This input gate 400 can actually perform as an amplifier or buffer in order to send a signal to the internal band-pass filter network 412 which is incorporated in the integrator 483. This type of amplifier could be a source follower or a change mode amplifier. This band-pass filter network comprises a pair of switches 405 and 406, a capacitor 410 and a capacitor 415, all in the manner as best shown in FIG. 5 of the drawings. This band-pass filter network 412 enables a sharing of the charge originally stored on an integrator-capacitor 402, with the band-pass filter applying over-sampled data to the capacitor 410. This filtering and charge sharing will effectively reduce high frequency transitions such as blinking signals and smooth a data profile.

By reference to FIG. 5, it can be seen that the switch 405 will be shifted to the lower or down position and the switch 406 will be actuated on those intervals in which many frames are skipped. This combination of switches enables a generation of an average value over many seconds and a signal issuing therefrom is present on a capacitor 415. The switches 405 and 406 are alternatively in the on position and alternatively in the off position so as to operate as a pair of non-overlapping and opened switches. Because of this action the switches 405 and 406 along with capacitors 402, 410 and 415 are referred to as a "ping-pong" band-pass filter. Average values are generated over many seconds on the capacitor 415.

The transistorized input amplifier 400 will send signals to the band-pass filter comprised of switches 405 and 406, as well as the capacitors 415 and 410. Although the transistor 400 is used, any type of amplifier or buffer could be used. The ping-pong buffer operates in a manner that data is over-sampled and introduced into the capacitor 410 which will reduce high frequency transients, as aforesaid.

A pair of sampled signals at the output of the integrator 482 are introduced through the buffers 420 and 425 which allows for the subtraction of the signal, and thereby providing a band-pass filtered output at the amplifier 430 in the temporal bypass filter circuit arrangement 484. This will have the effect of clipping high frequency components of the temporal spectrum, while cancelling drift at the lower end of the temporal spectrum, thereby reducing most noise. This attenuation of the high frequency noise will reduce false alarms from blinking signals and provide attenuation of low frequency noise. This will, in turn, reduce false alarms caused by spatial noise arising from the detectors. This spatial noise is removed by eliminating the drift from pixels in the parallel signal arrangement. In effect, the temporal band-pas filter 484 will remove noise prior to the spatial high-pass filter 486, thereby allowing high performance of similar fidelity to off-focal plane electronics. This will also allow a much higher degree of parallel processing and with much greater simplicity since the process occurs at the node of detection.

After temporal processing, the signal of the band-pass filter 484 output is introduced into the amplifier 430 and is sampled on the capacitors 435 and 440 as well as so-called "share" capacitor 450 for all local pixels. After sampling of the signal, onto capacitors 435 and 440, the signal will be allowed to settle and switches 436 and 437 will thereupon open isolating any unblurred image on the capacitors. In FIG. 5, only the lateral switches 451 and 452 are shown, although there are four such switches in actual practice. In any event and at that point, all four neighboring lateral switches 451 are thereupon opened and then, pursuant to a non-overlapping clock signal, the switch 452 will close. The interconnect capacitors which are connected to four nearest pixel cells will allow for sharing of the charge of the signal between all neighboring pixels. The switch 452 will then close in accordance with the timing established by the multi-mode control circuit. With the next cycle, the switch 452 opens and then the switch 451 will open, sharing the neighboring charge in proportion to the capacitive ratios and the signal fractions that have been shared. This charge blurring process will result in a blur signal stored on the capacitor 435, when the blurring operation is completed. Where there are four blurred charge sharing capacitors 450 per pixel, the signal is shared to create proper Gaussian-like blurred shapes.

It is also possible to connect the four diagonally located pixels, in addition to the pixels located at the aforesaid nearest pixel cells, to thereby obtain additional blurring. It is also possible to accomplish sharing on multiple pixels or during multiple blur cycles allowing the spread of the signal to farther unit cells, and particularly, neighboring unit cells. This will provide auto detecting image sensor capability with more tuneability for detecting features of different sizes. This provides the auto-detect image sensor with move tuneability for detection of features of different sizes.

After one or more blurring cycles, the blur signal is stored in the capacitor 435 and the unblurred signal is stored in the capacitor 440 in FIG. 5. The blur signal is then differenced from the unblurred signal and thereby create a signal similar to that of the output of the difference of Gaussians spatial high-pass filter. An image, such as the image 385, can thereupon be generated and examined. This effectively illustrates the image transformed after passing through the band-pass filter and the spatial filter stage.

Turning now to FIG. 3, it can be seen that FIG. 3a represents an input blur function in a signal 500 representative of an image in a scene. In FIG. 3b there is illustrated a spatially filtered and convolved rendition 510 of the input signal. A difference of Gaussian image signal 520 is shown in FIG. 3c and effectively showing the spatially filtered image. The difference of Gaussian filtered signal 520 is shown in FIG. 3d. The threshold value 530 is used to determine if the high-pass filtered pixel value exceeds the threshold level. The difference of Gaussian spatial high-pass filter generates the image 385 which can be seen in FIG. 4. In effect, this shows the high-pass filtered image transformed the after temporal band-pass stage and the spatial filter stage.

Turning again to FIG. 5, there is a comparator 465 creating the threshold output 475. This comparator 465 will effectively determine if the signal, at the node 449 and which is introduced into the differencing amplifier 455, exceeds that threshold level. This comparison will take place using the system internal or external clutter level which is, essentially, a user defined threshold. Obviously, any other level could be established by the user. The image can be visualized at 390 in FIG. 4 which illustrates the threshold value of the high pass filtered image and which has been transformed into a binary image. One can see that the output signal can be tapped at various processing stages so that the various transformed images, namely the standard video images, the gradient detect video and the activity detect video, are accessible through a suitable buffering circuit over the signal conductor 375. In effect, these images can be used for a variety of purposes as, for example, sensing of the image and automated target detection of a target object or a characteristic of that object.

When the first binary signals are generated at the output of the comparator 465, the digital logic pools the exceedance values which are the values of "high" or "one" from the comparator 465, the target can then be reinforced if it is near other pixels which exceed the threshold level or near other closely spaced apart pixels which exceed the threshold level from recently derived frames. Thus, if two or more local pixels exceed the threshold level, there would be likelihood that the pixel is real. Otherwise the pixel would often represent noise or clutter and be disregarded. This decision is automatically made by the pooling decision logic 740 in FIG. 7, as hereinafter discussed in more detail. The target object is reinforced, if it is real, as determined by this image and other close proximity spaced apart pixels which exceed the threshold level, or from other pixels which exceed the threshold level from other recent frames.

Turning now to FIG. 6 there is a chip layout configuration, or so-called floor-plan layout, in one embodiment of the invention. There is a chip unit core, often referred to as a "base", as identified by reference numeral 600. The automatic detection regions of interest are the so-called "foveal windows" which are illustrated in the areas 610. These areas could be designated as "fovea 1", "fovea 2", and "fovea 3". In this way, each object could represent a fovea which would be generated on the core of the chip.

The detector core or base is generally rectangular arranged and provided with a peripheral circuit on one marginal portion, with a row decoder 622 and on another marginal portion and with a column decoder 624, both of which are used for addressing the various pixels for ultimate re-accessing thereof. Also on a third marginal portion of the core is a fovea trigger comparator. The threshold levels of these various pixels are scanned out and each compared to the established threshold level, often referred to as a "local threshold", and each of the parallel comparators would then cause the generation of a digital signal, which is thereafter processed in digital format. The signals provide a selectable video output 630 having a full video or a read-out integrated video. The read-out integrated signal trigger command and control signals are received in the start/stop section 641 at a marginal portion of the core 600.

The state clocking and control inputs and mode configuration and biases are shown in the state clocking section 641 of FIG. 6. Section 642 in FIG. 6 shows the foveal region header encoder which creates the row and column address information of each pixel and digitally provides a stream of data to the video output 630 just prior to the fovea read-out sequence. The pooled exceedance read-out section and the decision logic 740 is output addressing from the memory 643 housed in the row and column memory 643 of FIG. 7. Timing is derived from the exceedance memory 643 and the center start and stop memory. Information is housed at the center stop/start section 644 which provided row and column start and stop address information to a row and column multiplexer and to decoders 622 and 624.

The control section 640 also includes a center start and stop calculating section 644 and an exceedance X-Y address memory 643, a region, foveal header encoder memory 642, and sequencing and timing section 641. The control section 640 and the sequencing and timing section 641 requires a mode select to enable selection of different operating modes. It can also read the input mode and select a full frame or foveal output.

The fovea size can be controlled, the foveal pixel resolution can be adjusted and the target threshold signal level can also be modified. The output threshold exceedance level from the output comparator 465 in FIG. 5 is pooled, pursuant to a user requirement, to thereby determine which regions in close proximity have exceeded the pixel threshold level. If these neighboring pixels do exceed the neighborhood frame pooling count level, then a target detection is considered to exist. Signals which are read-out of the integrated circuit are routed to the multi-mode video output and the exceedance then read-out in the foveal region, as described herein.

In general any desired number of pixels can be selected for evaluation to determine if a pixel region is considered to exceed the object threshold level and if so, a determination is made as to whether there is a sufficient number of exceedances to meet the pooling logic requirements. A pixel region is usually arbitrarily a limited number of pixels e.g. eight to twenty four pixels. In addition, any desired number of pixels exceeding a threshold level can be counted to determine whether the region exceeds a threshold level. If the region exceeds the threshold level, then all pixels are transmitted in a foveal region.

FIG. 7 effectively shows a two axis memory map of a set of local pixels and some of which exceed a threshold level and logically summed in a row by column format thereby providing a number of logical pooling exceedances. Reference numeral 700 is one form of a local memory map showing the pre-pooled levels of exceedance, namely, a pixel which exceeds a high threshold level state, and is represented by reference numeral 705. A low pixel state is identified by a pixel having reference numeral 710. Thus, the map 700 illustrates a 2*d* sub-region with six pixel areas exceeding and one not exceeding a threshold level. The pooling circuit will then create a read-out image for those pixel addresses exceeding the threshold level.

The output lines 720 in FIG. 7 represent connections to a summing node which counts or calculates these exceedances. There is a pooling decision logic circuit 740 which has pooling decision logic, such that after sufficient local pooling, a comparison is performed, and a real target detection can be declared at 760, or otherwise a false exceedance is determined. Memory mappings are illustrated in FIG. 8. The row by row address locations from the pooling memory are read and enables an X-Y address memory to provide a column and row location to the threshold X-Y address memory. In temporal order, the pooled exceedance memory addresses are thereupon read-out in real time in the same order and are introduced into a deep read-out integrated address memory with the row and the column address identified with each of the foveal regions. There is preferably a first-in and first-out pipe-line" memory organization using this memory address technique. Consequently there is nearly no limit to the number of addresses that the sensor can store. The on focal plane array processing system can scale down the data rates of extremely high format image sensors. The organization of the memory provides the capability of making a sensor array with as many pixels elements as possible to provide as high a resolution as desired and field of coverage possible without creating excess digital data at the output.

It can be seen that the logic is in close contact to the analog circuits which enables processing in the analog signal format. The high density of the micro-circuits which are used enables all of the circuits and the control sections to reside in the imaging cell without excess room requirements. The chip is compact and limited principally by circuit density of the unit cell core and the optical spot size and resolution requirements.

A plurality of pixels with the same design and interconnection to neighboring pixels can be obtained by creating an imager of any row and column pixel size, but which is driven primarily by design requirements. The circuit, as shown herein, has the capability of processing and extracting useful cues or detections. Therefore, it can be seen that other means to create spatial temporal processing for removing key real noise sources are possible to obtain.

Noise is reduced in the system of the present invention in four ways while using analog parallel processing at the focal plane. The analog comparator is running at a slow speed of operation so that certain noise bandwidth is reduced. All of the associated down-stream noise from the signal path is significantly mitigated or significantly lowered with the system of the present invention. Since the length of the signal path in the present invention can be measured in micrometers capacitive coupling, cross-talk noise, and excess thermal noise from high speed output drivers, of the type used in external process-based sensors, are significantly reduced. All of these immediately described advantages means that detection of noise is highly effective and that this noise can be significantly lowered with object sensing circuitry using focal plane array processing.

FIG. 9 is a flow chart which shows several important steps in the process of the present invention. In essence, it shows a signal flow chart for the activity with automatic regional selections and video output within the same integrated circuit chip. Step 1010 shows proper clocking and biasing of the activity sensor circuit. Step 1020 shows the user selected mode of operation and foveal region of interest size. Step 1030 shows the process of signal integration along with buffering, and band-pass filtering. Raw signal exceedances, then are processed into and provide pooled exceedances with a high confidence of target information. This pooled target information is sorted in a two-dimensional mapped internal memory, as shown at 643 in FIG. 6. Step 1040 shows the integrated circuit stored regions of interest fovea and provides a memory representation of the X,Y pixel address location of multiple targets in proper order for the scanned foveal read-out. Step 1050 provides a header encoding of the X-Y location, time, and other relevant information about the subregion and the information stored therein. Step 1060 shows the loading of the correct location of the memory locations into row and column selections decoders 622 and 624 for each foveal subregion. Step 1070 shows the start and then the ending of the read-out integration with the header data encoded into the regional digital data. Step 1080 shows that after the first subregion read-out integration, that the memory steps to the next region of interest read-out and the process of steps, 1030, 1040, 1050, 1060, 1070 is repeated over and over until that time when all the memory locations having stored X-Y located pooled exceedances are read-out.

At this point step 1090 will allow the option to read-out the entire full frame video. If this full frame mode is selected, then two or more modes may occur within one frame time. This frame time is driven, in part, by the read-out integration size and quantity of the selected foveal regions. Step 1095 shows that after the regions of interest are read, and after the full frame is read that the critical components of the analog signal chain are reset and the process of integration and temporal spatial filtering is again repeated.

FIG. 10 shows the significant benefits achieved with the serial-parallel processing of the invention, as opposed to the very common serial processing employed in prior art imaging systems. It can be observed that there is significant reduction in bandwidth when using the system of the present invention. The blurring and unblurring and filtering described above is reduced and the data rate resulting from external serial processing is reduced by using on-sensor processing, to reduce output bandwidth. The number of clock cycles is reduced, the spatial processing operations time is reduced and the threshold detection, cycle time is also reduced in the imaging system of the present invention.

FIG. 11 illustrates just some of the benefits the system of the present invention. In this case, 900 represent an image using a comparison of a normal and conventional sensor and with normal conventional processing. Movement of objects in that cluttered image are almost virtually undetectable. The figure represented by 910 represents an auto-foveated sensor with active pixels off and the element 930 represents a binary regional object in an image.

ADVANTAGES AND BENEFITS OF THE INVENTION

Some of the advantages are that the imaging system of the present invention provides internal filtering in the chip. It detects intensity charge and movement and induces gradients and intensity. The system of the invention will output high-resolution fovea without downstream electronics, and the sensors can enable generation of region of interest windows anywhere in the field of view. There is a substantial sensor bandwidth reduction since the fovea requires transmitting out pixels only with activity and avoids transmitting non-active pixels, that is pixels having no active data. The present system also allows detection, even in the presence of camouflage and clutter The imaging circuit of the present invention is based on and uses an integrated circuit chip in which one or more image sensors is mounted on the circuit chip and one or more separate processing circuits are also mounted on that chip or neighboring circuit chip, thereby allowing sensing and the processing of the images at a focal plane. Moreover, the invention provides for parallel processing and this allows for the efficient extraction of intensity variations in both time and space.

The circuitry employs analog signal processing at the front end, as opposed to purely digital processing. It also uses charge sharing and summing as well as differencing. This allows for filtering and thresholding to achieve object target detection.

Speed and amplitude variations of a target object can be detected with the present imaging circuit thereby allowing for discrimination in a narrow or wide target dynamic characteristic space. As a simple example, if a target is imaged by a lens onto two pixels which move over the image plane, a threshold and comparison can be performed directly in the imager circuitry and the comparison can be accomplished in a parallel process.

This new method and the dedicated circuitry to accomplish this method allow for compactness and efficiency and offers a large number of scientific and practical improvements over the current state of off image processing. Even moreso, the invention allows for serial on-image processing and of equal importance the on-board processing. In this way, the automated cuing in the image sensors allows for a significant innovation in size, power and weight, while performing processing that previously had to be performed off of the image focal plane sensor array in external electronics.

Due to the fact that the circuit and method of the present invention allow for this performance with both compactness and increased efficiency, there is the added advantage that it provides more images processing to be performed on the focal plane array. Not only is this more efficient from a spatial layout point of view, but in this technique, pixel values are already in perfect optical alignment as a result of projection of the image onto the focal plane of the imager. This allows for conversion of the incident photons, to photo-electrons using less processing and also allows for processing on adjacent chips, often referred to as "nearest neighbor" processing functions and this processing can occur in a highly parallel fashion with each pixel. This allows for increased processing speed and in addition, dramatically increases the processing efficiency.

The present invention also improves the signal to noise ratio and thereby improves the ultimate sensitivity of the image circuitry due to the fact that the integration, sensing, thresholding and detection is performed at or in close proximity to the pixel.

In addition to the foregoing, processing at the focal plane allows for extracting of various characteristics of an activity such as a moving target object. Other object characteristics which can be extracted and imaged include, for example, hot, cold, small, large, fast moving or slow moving and even stationary. This has a significant benefit for the detection of highly sensitive or secretive operations. One performing these very important functions at the pixel, or even near the pixel, will not encounter additive noise from the read-out integrated amplifier and even the fast output multiplexer since they are completely avoided.

In the current focal plane systems where the image and particularly the pixels of that image must be multiplexed down a complex and longer signal chain, such as the column amplifier, more noise is added to signal sample. This additive noise can be significant in that noise increases with the bandwidth of the multiplexer circuit. This disadvantage can be overcome if signal averaging or other methods of signal level enhancement has been performed at the unit cell.

In the prior art systems, as a result, the downstream noise must be kept lower than unit cell noise so that the sensor will have a detection range set by photon shot noise and not the internal electronic noise created in the image sensor. It may be appreciated that additive noise results in more noise and a lower signal-to-noise ratio, as well as a lowering of the detection range, such as, the object of interest detection range. In addition to the foregoing, power utilization is also considerably less in parallel processing performed right at the read-out integrated circuit. Using processing at the readout integrated circuit allows for a slow and highly parallel processing rate.

The sensor itself is essentially a low cost sensor and is estimated to be eight times less costly (in real costs) than commercially available sensors of the type which must be used with conventional image processors. With the present invention there is a wider range of sensor activity and more parallel processing. All of this gives rise to extended battery life and lower weight as well as a higher degree of portability. From a utilization standpoint, there is significant advantage of increased surveillance and increased stealthiness with the imaging system of the present invention. The system can be constructed so that it is small and compact, using coin-sized sensors with excellent detection functionality. This, in turn, leads to better and sooner detection of secretive planning, as for example, better and sooner detection of terror events.

In addition to the foregoing, the prior art image detecting circuits essentially used commercially available off-the-shelf image processors. The internal processor in the present invention is designed specifically for the purposes of tracking target objects and even certain characteristics of type target objects. The circuit of the invention is also a high density circuit which allows upwards of one hundred object elements in the pixel region of the imager electronics.

FIG. 11 illustrates the multiple mode operation of the circuit of the invention and which is made possible by the parallel output or so called processing signal chain "pick-off points" and the prefiltering of non uniformities and offset levels enabling placing of an output video into the correct region of the dynamic range. The image identified as 910 in FIG. 11 illustrates a normal video image 900, but showing an object in camouflage and clutter in one mode of automatic target alerting of actual objects in a video. The image 910 is a regional zoom-in image and can be made in a local regional area as a binary 1 bit shown in the image 930, or a full 14-16 bit data image that is useful for further target/object processing in a down-stream computer or image processor unit as shown in the image 920.

The auto-detecting system and method of the invention in summary form also:
1) provides auto detecting imager using internal filtering in the chip;
2) detects movement/gradients in intensity;
3) outputs high resolution fovea without down-stream electronics;
4) spawn high resolution windows anywhere in the field of view;
5) provides dramatic reduction in sensor bandwidth;
6) has wireless capability;
7) provides fovea time constant to allow detection in camouflaged/clutter;
8) provides efficient, autonomous detection and tracking; and
9) generates full 14 bit or binarized target images.

Thus there has been illustrated and described a unique and novel system and method for the imaging of a scene and an object or characteristic of the object in the scene, and which thereby fulfills all of the objects and advantages which have been sought. It should be understood that many changes, modifications, variations and other uses and applications which will become apparent to those skilled in the art after considering this specification and the accompanying drawings. Therefore, any and all such changes, modifications, variations and other uses and applications which do not depart from the spirit and scope of the inventions are deemed to be covered by the invention.

I claim:

1. A circuit, per photodetector, that is a component of an ReadOut Integrated Circuit (ROIC), for a sensor comprising an array of pixels including photodetectors integrated with a ROIC, each circuit interfaced to a time integrated signal of each photodetector, the circuit comprising:
   a filter, comprising at least a temporal bandpass filter element, connected to the integrated photodetector signal, comprising;
      a high frequency averaging element oversampled at a user determined rate, configured to shunt signal elements higher in frequency,
      a low frequency pass element, sampled at a user determined interval greater than at least one ROIC frame time, configured to sample-and-hold/average offset and signal elements lower in frequency than the ROIC frame rate while averaging out high frequency elements, and;
      a difference circuit to subtract the averaging low frequency element signal from the current frame high frequency averaging element signal to produce a temporal bandpassed signal
   and;
   an exceedance circuit, comprising a comparator circuit for comparing a threshold signal to the filter output signal creating a digital pixel exceedance signal.

2. The circuit of claim 1 wherein the filter further comprises a spatial bandpass filter element connected to the output of the temporal bandpass filter element, comprising;
   switched integrators connected to the temporal bandpass filter elements outputs of neighboring pixel circuits,
   a delay and summing circuit for combining the switched integrated neighboring pixel signals, thereby creating a signal representing a blurred signal of the pixel neighborhood, and;
   difference circuit for subtracting the blurred signal from the temporal bandpass filter output signal, creating a temporally and spatially bandpass filtered signal as the output of the filter.

3. The circuit of claim 2 wherein the switched integrators are connected to at least the circuits corresponding to each adjacent pixel for every pixel in the array.

4. The circuit of claim 2 wherein the switching frequency of the switched neighboring pixel integrators is selectable to determine the spatial extent of the blurring.

5. An ROIC integrated with a detector array, with pixel exceedance circuits interfaced to detectors for each pixel, comprising pooling logic comprising;
   a pooling region generator that creates a pooling region consisting of a predetermined number in X and Y of surrounding pixels for every pixel in the array; and, a pooled exceedance signal generator that adds the number of pixel exceedances in each pooling region and compares the sum to a predetermined number, wherein when the sum of the pixel exceedances exceeds the predetermined number, a binary pooled exceedance signal is generated.

6. The ROIC of claim 5 further comprising an automated fovea generator, comprising logic for at least one of
creating a fovea of predetermined X and Y number of pixels centered around each pooled exceedance region, or;
if a plurality of pooled exceedance regions lie within the X and Y fovea size, performing a weighted centering of the fovea around the plurality of pooled exceedance regions.

7. The ROIC of claim 6 wherein data from the pixels in only the automatically created fovea can be selected for transmission from the ROIC as opposed to data from all pixels in the array.

8. The ROIC of claim 7 wherein selectively pixel data from each fovea may be transmitted as at least one of pixel exceedance or digitized temporal bandpass filter output signal data.

9. An ROIC including circuits as in claim 1 including pooling logic, comprising;
a pooling region generator that creates a pooling region consisting of a predetermined number in X and Y of surrounding pixels for every pixel in the array; and,
a pooled exceedance signal generator that adds the number of pixel exceedances in each pooling region and compares the sum to a predetermined number, wherein when the sum of the pixel exceedances exceeds the predetermined number, a binary pooled exceedance signal is generated.

10. The ROIC of claim 9 further comprising an automated fovea generator, comprising logic for at least one of
creating a fovea of predetermined X and Y number of pixels centered around each pooled exceedance region, or;
if a plurality of pooled exceedance regions lie within the X and Y fovea size, performing a weighted centering of the fovea around the plurality of pooled exceedance regions.

11. The ROIC of claim 10 wherein data from the pixels in only the automatically created fovea can be selected for transmission from the ROIC as opposed to data from all pixels in the array.

12. The ROIC of claim 10 wherein selectively pixel data from each fovea may be transmitted as at least one of pixel exceedance or digitized temporal bandpass filter output signal data.

13. The circuit of claim 1 wherein the filter of the circuit further comprises a spatial bandpass filter element connected to the output of the temporal bandpass filter, comprising;
switched integrators connected to the temporal bandpass filter outputs of neighboring pixel circuits,
a delay and summing circuit for combining the switched integrated neighboring pixel signals, thereby creating a signal representing a blurred signal of the pixel neighborhood, and;
difference circuit for subtracting the blurred signal from the temporal bandpass filter output element signal, creating a temporally and spatially bandpass filtered signal as the output of the filter element.

14. The spatial bandpass filter of claim 13 wherein the switched integrators are connected to at least the circuits corresponding to each adjacent pixel for every pixel in the array.

15. The spatial bandpass filter of claim 14 wherein the switching frequency of the switched neighboring pixel integrators is selectable to determine the spatial extent of the blurring.

16. A circuit, per photodetector, that is a component of an ReadOut Integrated Circuit (ROIC), for a sensor comprising an array of pixels including photodetectors integrated with a ROIC, each circuit interfaced to a time integrated signal of each photodetector, the circuit comprising
a filter, comprising;
a temporal bandpass filter element, connected to the integrated photodetector signal; and
a spatial bandpass filter element connected to the output of the temporal bandpass filter element, comprising;
switched integrators connected to the temporal bandpass filter elements outputs of neighboring pixel circuits,
a delay and summing circuit for combining the switched integrated neighboring pixel signals, thereby creating a signal representing a blurred signal of the pixel neighborhood, and;
a difference circuit for subtracting the blurred signal from the temporal bandpass filter output signal, creating a temporally and spatially bandpass filtered signal as the output of the filter,
and;
an exceedance circuit, comprising a comparator circuit for comparing a threshold signal to the filter output signal creating a digital pixel exceedance signal.

* * * * *